United States Patent Office 3,434,403
Patented Mar. 25, 1969

3,434,403
AUTOMATIC EXPOSURE CONTROL CIRCUIT
Friedrich Biedermann, Unterhaching, Munich, and Friedrich Bestenreiner, Grunwald, near Munich, Germany, assignors to Agfa-Gevaert Aktiengesellschaft, Leverkusen, Germany
Filed Oct. 23, 1965, Ser. No. 503,260
Claims priority, application Germany, Nov. 6, 1964, A 47,539
Int. Cl. G01j 1/46
U.S. Cl. 95—10                                16 Claims

ABSTRACT OF THE DISCLOSURE

An automatic exposure control for photographic apparatus wherein an electromagnet is energized in response to output signal from a multivibrator circuit to close the shutter. The input of the multivibrator circuit is connected to a bridge circuit which compares the voltage drop across a photoresistor with the output voltage produced by an R-C unit independently of scene brightness. The bridge circuit produces a time dependent voltage in accordance with such comparison. When the time dependent voltage reaches a certain magnitude, the multivibrator circuit energizes the electromagnet to complete the exposure by closing the shutter.

---

The present invention relates to an automatic exposure control circuit. More particularly, the invention relates to a circuit for automatically controlling the exposure time of photographic apparatus such as, for example, a camera.

Automatic exposure control circuits of known type utilize a photoresistor exposed to the light from the object to be photographed. A current is provided through the photoresistor. An electromagnet is utilized to control the position of a shutter lamella. The current flowing through the photoresistor is utilized to charge a condenser. When the voltage of the condenser reaches a predetermined magnitude, the electromagnet is energized or actuated to move the shutter lamella to terminate the exposure time. A circuit of this type has the disadvantage of permitting very little leeway in adjustment of other factors which influence the exposure by means of adjustment of the components of the circuit without complete change of the photoresistor circuit operation. The other factors which influence the exposure are, for example, the diaphragm aperture and the film sensitivity.

The principal object of the present invention is to provide a new and improved automatic exposure control circuit.

Another object of the present invention is to provide an automatic exposure control circuit which permits the adjustment of factors which influence the exposure without complete change of the photoresistor circuit operation.

In accordance with the present invention, an automatic exposure control circuit comprises means forming a light path extending to photosensitive film and a shutter lamella adapted to be interposed in the light path. A photoresistor is exposed to scene light. A voltage source provides a current flow through the photoresistor so that a voltage drop appears across the photoresistor in accordance with the intensity of light impinging upon the photoresistor. A voltage providing variable condenser and variable resistor produce an output voltage when the shutter lamella is in a position outside the light source. A multivibrator has an input and an output connected to an electromagnet, the electromagnet being adapted to control the position of the shutter lamella. A bridge circuit including the voltage source, the photoresistor and the voltage providing variable condenser and variable resistor is connected to the input of the multivibrator. The bridge circuit compares the voltage drop across the photoresistor with the output voltage of the voltage providing variable condenser and variable resistor and produces a time dependent voltage in accordance with the comparison whereby when the time dependent voltage reaches a predetermined magnitude, the time dependent voltage switches the multivibrator to a stable condition in which it produces an output signal at its output to energize the electromagnet to interpose the shutter lamella in the light path and thereby terminate the exposure of the photosensitive film.

In order that the present invention may be readily carried into effect, it will now be described with reference to the accompanying drawings, wherein.

In the figures, the same components are identified by the same reference numerals.

Figure 1:
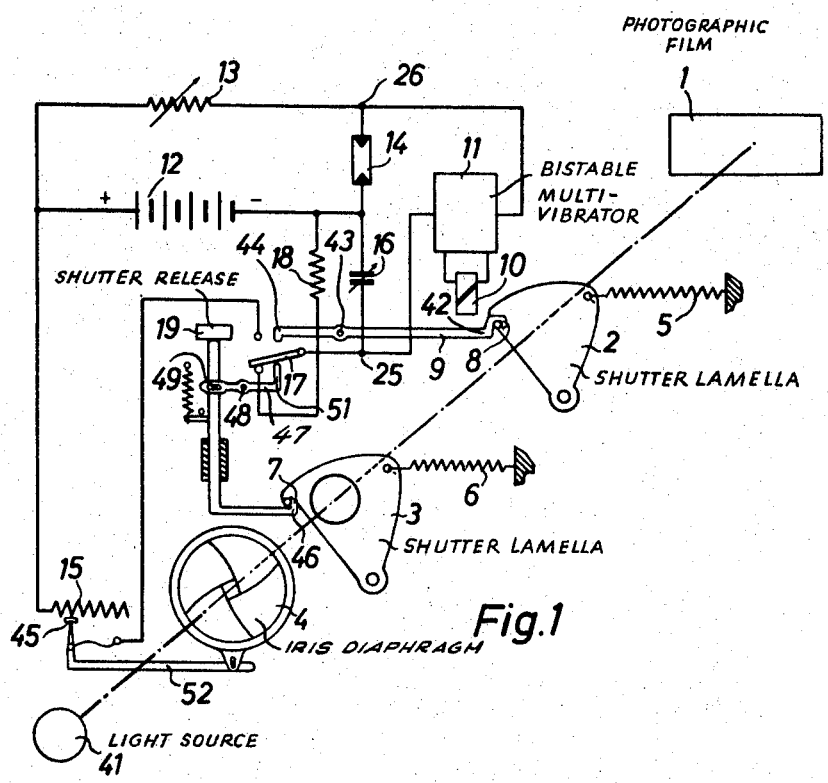
FIG. 1 is a circuit diagram of an embodiment of the automatic exposure control circuit of the present invention.

In FIG. 1, two shutter lamellae 2 and 3 and an iris diaphragm 4 are interposed in the light path between a light source 41 and a photographic film 1. In the figure, the shutter lamellae are in their initial positions prior to shutter release. The lamella 3 is thus in the light path and the lamella 2 does not block the light path. A spring 5 continually urges the lamella 2 in clockwise direction and a spring 6 continually urges the lamella 3 in a clockwise direction. The lamella 2 is held in its position shown in FIG. 1 by a catch device 8 and the lamella 3 is held in its position shown in FIG. 1 by a catch device 7.

The catch device 8 is at one end 42 of a lever 9 which is pivotally mounted at a pivot point 43. The lever 9 is positioned by an electromagnet 10 which, when energized, moves said lever in counterclockwise direction about the pivot point 43 to release the catch 8 by raising the end 42 of said lever. When the catch 8 is released, the lamella 2 is moved in a clockwise direction into the light path. When the lever 9 is moved in a counterclockwise direction by the electromagnet 10, the other end 44 of said lever is lowered.

The electromagnet 10 is energized or actuated by a bistable multivibrator or trigger circuit 11. The bistable multivibrator 11 is connected to a bridge circuit having a DC source such as, for example, a battery 12, connected in its diagonal branch. A variable resistor 13 and a photoresistor 14 are connected in series in one branch arm of the bridge. The photoresistor 14 is positioned in the light path. A variable resistor 15 and a variable condenser 16 are connected in series via a switch 17 in the other branch arm of the bridge. In its position shown in FIG. 1, switch 17 connects the variable condenser 16 into a closed loop with a resistor 18 so that said resistor short-circuits said variable condenser. When the switch 17 is in its other position, opposite that shown in FIG. 1, it closes the branch arm of the bridge and connects the variable resistor 15 in series with the variable condenser 16 across the battery 12, so that current flows through said resistor and said condenser. The resistance varying tap 45 of the variable resistor 15 is mechanically coupled to the iris diaphragm 4 via a coupling arm 52 in a manner which varies the resistance of the said variable resistor in correspondence with variation of the aperture of said iris diaphragm.

A shutter release 19 releases the shutter when it is depressed. When the shutter release 19 is depressed, it releases the catch 7 by lowering the end 46 of said shutter release. When the catch 7 is released, the lamella 3 is moved in a clockwise direction out of the light path. When the shutter release 19 is depressed, it moves a pivot arm 47 in a counterclockwise direction about a pivot point 48; one end 49 of said pivot arm being coupled to said shutter release. When the pivot arm 47 is moved in a counterclockwise direction, its other end 51 is raised and raises the switch 17 to its opposite position from that shown in FIG. 1. The switch 17 then connects the variable resistor 15 in circuit with the variable condenser 16. When the lever 9 is moved in a counterclockwise direction by the electromagnet 10, the end 44 thereof is lowered and lowers the switch 17 to its position shown in FIG. 1.

The operation of the automatic exposure control circuit of FIG. 1 is as follows. The aperture of the iris diaphragm 4 is initially adjusted in the usual manner in accordance with the light, distance and setting of the object to be photographed. When the aperture of the diaphragm 4 is adjusted, the resistor of the variable resistance 15 is correspondingly adjusted by the coupling arm 52. If the shutter release 19 is then depressed, the catch device 7 is released and the lamella 3 is moved out of the light path by the spring 6. The light then impinges upon the photographic film 1.

When the shutter release 19 is depressed, it moves the switch 17 to its position opposite that shown in FIG. 1, so that the series circuit of the battery 12, the variable resistor 15 and the variable condenser 16 is closed and said condenser is charged through said resistor. The condenser 16 charges at a rate and to a voltage determined by the selected resistance value of the variable resistor 15 and the selected capacitance value of said condenser. At the same time that the variable condenser 17 is charging, a current flows through the photoresistor 14 in accordance with the intensity of light impinging on the same and in accordance with the resistance of the variable resistor 13. There is a substantially constant voltage drop across the photoresistor 14, because the exposure conditions during the taking of a picture remain substantially constant.

Figure 3:
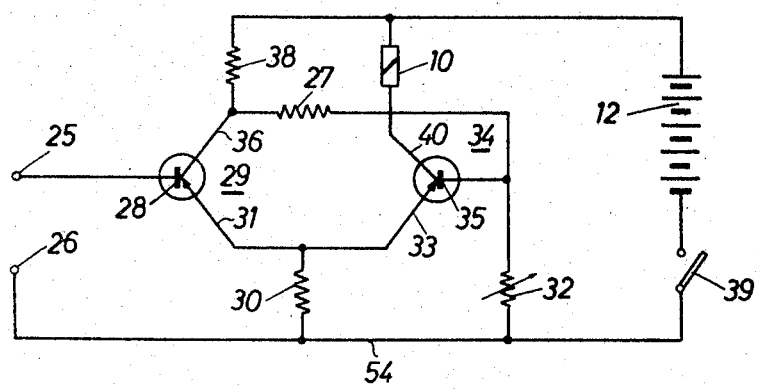
FIG. 3 is a circuit diagram of an embodiment of a known trigger circuit which may be utilized in the embodiments of FIGS. 1 and 2.

Since the photoresistor 14 and the variable condenser 16 are connected in series with each other, and since one terminal of the battery 12 is connected to a common point in the connection between said photoresistor and said condenser, the potential difference across the series connection of said photoresistor and said condenser varies with time. When a predetermined magnitude is reached by the potential difference across the series connection of the photoresistor 14 and the variable condenser, the bistable multivibrator or trigger circuit 11 is switched in its stable condition and produces an output signal which energizes or actuates the electromagnet 10. The trigger circuit 11 may comprise any suitable trigger, bistable multivibrator or flip-flop circuit such as, for example, a modified Schmitt trigger circuit, as shown in FIG. 3.

When the electromagnet 10 is energized it moves the lever 9 in a counterclockwise direction about the pivot point 43, so that the catch device 8 is released by the raising of the end 42 of said lever. When the catch 8 is released, the spring 5 moves the lamella 2 into the light path, so that the light impinging on the film 1 is blocked and the exposure is terminated. When the lever 9 is moved in a counterclockwise direction about the pivot point 43, the end 44 of said lever is lowered and moves the switch 17 back to its initial position, shown in FIG. 1, and the condenser 16 discharges through the resistor 18.

If the diaphragm 4 is then cocked in the usual manner, the lamellae 2 and 3 are returned to their initial positions in a counterclockwise direction against the force of the springs 5 and 6, respectively. The camera is then ready for the next exposure.

Figure 2:
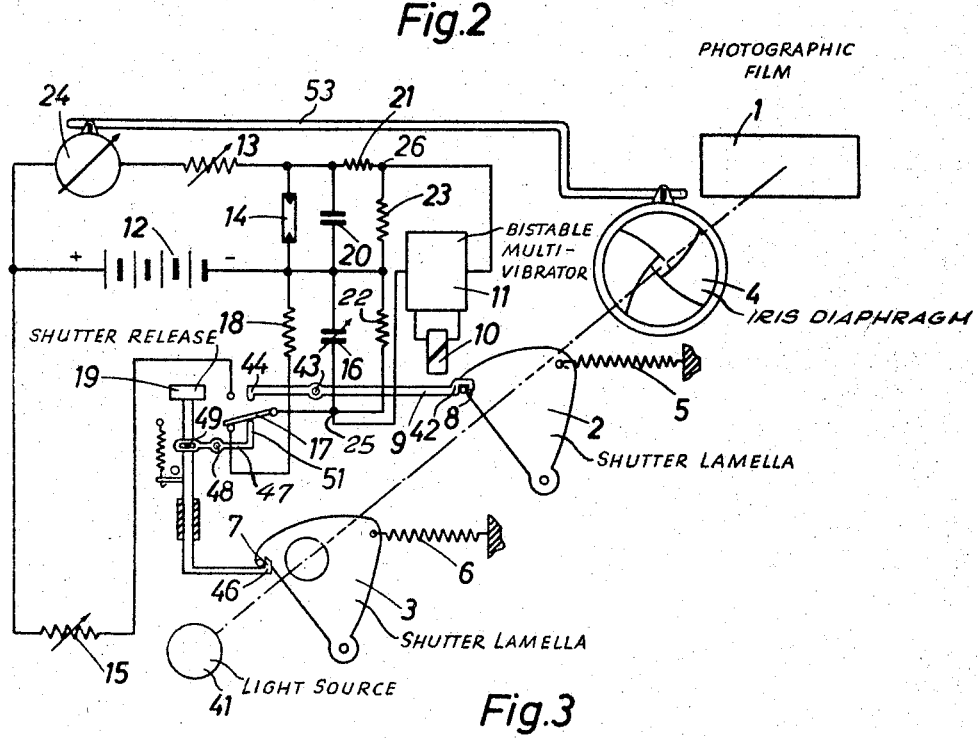
FIG. 2 is a circuit diagram of another embodiment of the automatic exposure control circuit of the present invention.

The embodiment of FIG. 2 is the same as that of FIG. 1, except for additional components 20, 21, 22, 23 and 24. A condenser 20 is connected in parallel with the photoresistor 14. The condenser 20 functions to prevent a momentary lapse of voltage if an excessively high load is encountered in the multivibrator circuit. A resistor 21 is connected between the photoresistor 14 and the trigger circuit 11. The resistor 21 functions as a buffer between the trigger circuit 11 and the photoresistor 14. A resistor 22 is connected in parallel with the variable condenser 16. A resistor 23 is connected in series with the resistor 21 and the series connection of the resistors 21 and 23 is connected in parallel with the condenser 20. The resistors 22 and 23 function to eliminate residual charges of the variable condenser 16.

A diaphragm aperture control member 24 is mechanically coupled to the iris diaphragm 4 via a coupling arm 53. The diaphragm arrangement may comprise a "cat's eye" diaphragm comprising two lamellae directly controlled by a movable member. The embodiment of FIG. 2 is controlled by program; that is, exposure intensity is controlled by both the iris diaphragm 4 and the exposure time control operation of the circuit. The diaphragm aperture control member 24 and the resistor 15 and capacitor 16 are adjusted to provide the desired exposure. The diaphragm aperture control member 24 may comprise, for example, an ammeter.

FIG. 3 is an embodiment of a circuit which may be utilized as the trigger circuit 11 of FIGS. 1 and 2. The circuit of FIG. 3 is essentially a modified Schmitt trigger circuit. The input terminals 25 and 26 are connected to the positive terminals of the variable condenser 16 and the photoresistor 14, respectively. A first transistor 29 has a base electrode 28, an emitter electrode 31 and a collector electrode 36 and a second transistor 34 has a base electrode 35, an emitter electrode 33 and a collector electrode 40. The input terminal 25 is directly connected to the base electrode 28 of the transistor 29. The emitter electrodes 31 and 33 of the first and second transistors are connected in common.

The input terminal 26 is connected to one terminal of the battery 12 via a switch 39 and a lead 54. The input terminal 26 is connected to the common emitter connection via a resistor 30 and the lead 54 and to the base electrode 35 of the second transistor 34 via a resistor 32. The collector electrode 36 of the first transistor 29 is connected to the base electrode 35 of the second transistor 34 via a resistor 27. The electromagnet 10 is connected between the collector electrode 40 of the second transistor 34 and the other terminal of the battery 12. The collector electrode 36 of the first transistor 29 is connected to the same terminal of the battery 12 as the electromagnet 10 through a resistor 38. The switch 39 is operated by the shutter release 19 (FIGS. 1 and 2) and energizes or actuates the trigger circuit 11 when it is closed.

The trigger circuit 11 of FIG. 3 functions in a known manner. When the voltage at the input terminals 25 and 26 decreases to less than a predetermined level of magnitude the second transistor 34 is switched to its conductive condition and conducts a current through the electromagnet 10 so that said electromagnet is energized or actuated. The predetermined level of magnitude is variable by variation of the variable resistor 32.

The automatic exposure control circuit of the present invention may be utilized, of course, solely for exposure time control without a coupling to the diaphragm 4.

A plurality of condensers may be utilized instead of the variable condenser 16 and may be connected into the circuit in accordance with the sensitivity of the film.

Variation of the variable condenser 16 and the variable resistor 15 permits adjustment for other factors which influence the exposure such as, for example, the aperture and the film sensitivity.

Mechanical coupling of the control for the iris diaphragm 4 to the resistance varying tap 45 of the variable resistor 15 insures automatic control of the exposure time in accordance with the light conditions of the object photographed.

The connection of the ammeter 24 into the bridge circuit in the embodiment of FIG. 2 and its mechanical coupling with the control for the iris diaphragm 4 insures that the proper quantity of light impinges upon the photosensitive film 1. This enables a program control with simple means in which the relation of the exposure time and the aperture varies with the intensity of light. This must be considered because the time dependent voltage produces a current through the variable condenser 16 which is not necessarily linear.

While the invention has been described by means of specific examples and in specific embodiments, we do not wish to be limited thereto, for obvious modifications will occur to those skilled in the art without departing from the spirit and scope of the invention.

What we claim is:

1. An automatic exposure control, comprising means forming a light path; shutter lamella means adapted to be interposed in said light path; a photoresistor exposed to scene light; voltage means for providing a current flow through said photoresistor so that a voltage drop appears across said photoresistor in accordance with the intensity of scene light; voltage providing means for producing a time dependent voltage independently of said intensity when said shutter lamella means is in a position outside said light path; multivibrator means having an input and an output; electromagnet means connected to said output and adapted to control the position of said shutter lamella means; and circuit means including said voltage means, said photoresistor and said voltage providing means and connected to said input for comparing the voltage drop across said photoresistor with the output voltage of said voltage providing means and for producing a time dependent voltage in accordance with such comparison so that, when said time dependent voltage reaches a predetermined magnitude, said multivibrator means energizes said electromagnet means to interpose said shutter lamella means in said light path.

2. An automatic exposure control as claimed in claim 1, wherein said circuit mean comprises a bridge circuit.

3. An automatic exposure control as claimed in claim 1, wherein said voltage providing means comprises a condenser.

4. An automatic exposure control as claimed in claim 1, wherein said voltage providing means comprises a variable condenser and a variable resistor adapted to be connected in series with said variable condenser.

5. An automatic exposure control as claimed in claim 1, wherein said voltage providing means comprises a plurality of condensers.

6. An automatic exposure control as claimed in claim 1, wherein said circuit means includes a variable resistor connected in series with said photoresistor across said voltage means.

7. An automatic exposure control as claimed in claim 1, wherein said multivibrator means comprises a bistable multivibrator circuit.

8. An automatic exposure control as claimed in claim 1, wherein said light path forming means comprises diaphragm means, providing means comprising a variable condenser and a variable resistor adapted to be connected in series with said variable condenser, said variable resistor having resistance varying means and further comprising control means for controlling the aperture of said diaphragm means and coupling means connecting said resistance varying means to said control means.

9. An automatic exposure control as claimed in claim 1, wherein said light path forming means comprises diaphragm means and further comprising control means for controlling the aperture of said diaphragm means, ammeter means connected to said photoresistor, and coupling means connecting said ammeter means to said control means.

10. An automatic exposure control as claimed in claim 1, wherein said shutter lamella means comprises a pair of independently positioned shutter lamellae and wherein said voltage providing means comprises a variable condenser and a variable resistor adapted to be connected in series with said variable condenser, said automatic exposure control circuit further comprising switch means connected to said variable condenser and adapted to connect said variable condenser in series with said variable resistor and shutter release means for controlling the position of one of said shutter lamellae and for controlling the position of said switch means.

11. An automatic exposure control as claimed in claim 10, wherein said circuit means includes said variable condenser, said switch means, said variable resistor and said voltage means connected in series circuit arrangement.

12. An automatic exposure control, comprising means forming a light path; shutter lamella means adapted to be interposed in said light path, said shutter lamella means comprising a pair of spaced independently positioned shutter lamellae; a photoresistor exposed to scene light; voltage means for providing a current flow through said photoresistor so that a voltage drop appears across said photoresistor in accordance with the intensity of light impinging upon said photoresistor; voltage providing means for producing an output voltage when said shutter lamella means is in a position outside of said light path, said voltage providing means comprising a variable condenser and a variable resistor adapted to be connected in series with said variable condenser; discharge resistor means; switch means connected to said variable condenser and being selectively positioned in a first position in which it connects said variable condenser in series with said variable resistor and a second position in which it connects said variable condenser in short circuit with said discharge resistor means; shutter release means for controlling the position of one of said shutter lamellae and the position of said switch means; multivibrator means having an input and an output; electromagnet means connected to the output of said multivibrator means and adapted to control the position of said shutter lamella means; and circuit means including said voltage means, and resistor, said resistor means, said photoresistor and said voltage providing means and connected to the input of said multivibrator means for comparing the voltage drop across said photoresistor with the output voltage of said voltage providing means and for producing a time dependent voltage in accordance with such comparison whereby, when said time dependent voltage reaches a predetermined magnitude, it switches said multivibrator means to a stable condition in which said multivibrator means produces an output signal at its output to energize said electromagnet means to interpose said shutter lamella means in said light path and to thereby terminate the exposure.

13. An automatic exposure control as claimed in claim 12, wherein said shutter release means is adapted to move said switch means to its first position and said electromagnet means is adapted to move said switch means to its second position.

14. An automatic exposure control, comprising means forming a light path; shutter lamella means adapted to be interposed in said light path; a photoresistor exposed to scene light; voltage means for providing a current flow through said photoresistor so that a voltage drop appears across said photoresistor in accordance with the intensity of light impinging upon said photoresistor; voltage providing means for producing an output voltage when said shutter lamella means is in a position outside of said light path, said voltage providing means comprising a first condenser; a second condenser connected in parallel with said photoresistor; multivibrator means having an input and an output; electromagnet means connected to the output of said multivibrator means and adapted to control the position of said shutter lamella means; and circuit means including said voltage means, said photoresistor and said condensers and connected to the input of said multivibrator means for comparing the voltage drop across said photoresistor with the output voltage of said voltage providing means and for producing a time dependent voltage in accordance with such comparison whereby, when said time dependent voltage reaches a predetermined magnitude, it switches said multivibrator means to a stable condition in which said multivibrator means produces an output signal at its output to energize said electromagnet means to interpose said shutter lamella means in said light path and to thereby terminate the exposure.

15. An automatic exposure control, comprising means forming a light path; shutter lamella means adapted to be interposed in said light path; a photoresistor exposed to scene light; voltage means for providing a current flow through said photoresistor so that a voltage drop appears across said photoresistor in accordance with the intensity of light impinging upon said photoresistor; voltage providing means for producing an output voltage when said shutter lamella means is in a position outside of said light path; multivibrator means having an input and an output; a resistor connected between said photoresistor and said input; electromagnet means connected to the output of said multivibrator means and adapted to control the position of said shutter lamella means; and circuit means including said voltage means, said resistor, said photoresistor and said voltage providing means and connected to the input of said multivibrator means for comparing the voltage drop across said photoresistor with the output voltage of said voltage providing means and for producing a time dependent voltage in accordance with such comparison whereby, when said time dependent voltage reaches a predetermined magnitude, it switches said multivibrator means to a stable condition in which said multivibrator means produces an output signal at its output to energize said electromagnet means to interpose said shutter lamella means in said light path and to thereby terminate the exposure.

16. An automatic exposure control, comprising means forming a light path; shutter lamella means adapted to be interposed in said light path; a photoresistor exposed to scene light; voltage means for providing a current flow through said photoresistor so that a voltage drop appears across said photoresistor in accordance with the intensity of light impinging upon said photoresistor; voltage providing means for producing an output voltage when said shutter lamella means is in a position outside of said light path, said voltage providing means comprising a variable condenser; a first resistor connected in parallel with said variable condenser; a second condenser connected in parallel with said photoresistor; a second resistor connected in parallel with said second condenser; multivibrator means having an input and an output; electromagnet means connected to the output of said multivibrator means and adapted to control the position of said shutter lamella means; and circuit means including said voltage means, said resistors, said photoresistor and said condensers and connected to the input of said multivibrator means for comparing the voltage drop across said photoresistor with the output voltage of said voltage providing means and for producing a time dependent voltage in accordance with such comparison whereby, when said time dependent voltage reaches a predetermined magnitude, it switches said multivibrator means to a stable condition in which said multivibrator means produces an output signal at its output to energize said electromagnet means to interpose said shutter lamella means in said light path and to thereby terminate the exposure.

References Cited
UNITED STATES PATENTS

| | | | |
|---|---|---|---|
| 3,063,354 | 11/1962 | Matulik et al. | 95—10 |
| 3,205,803 | 9/1965 | Burgarella et al. | 95—10 |
| 3,257,919 | 6/1966 | Sato et al. | 95—10 |
| 3,295,424 | 1/1967 | Biber | 95—10 |
| 3,324,779 | 6/1967 | Nobusawa et al. | 95—10 |
| 3,336,850 | 8/1967 | Otani et al. | 95—10 |

NORTON ANSHER, *Primary Examiner.*

J. F. PETERS, *Assistant Examiner.*

U.S. Cl. X.R.

95—53